United States Patent
Giers et al.

(10) Patent No.: US 8,121,756 B2
(45) Date of Patent: Feb. 21, 2012

(54) DEVICE AND METHOD FOR DRIVING DYNAMICS CONTROL IN A VEHICLE

(75) Inventors: Bernhard Giers, Bad Soden (DE);
Robert Schmidt, Kelkheim (DE);
Thomas Sticher, Reinheim (DE);
Thorsten Ullrich, Gernsheim (DE)

(73) Assignee: Continental Teves AG & CO, OHG, Frankfurt (DE)

( * ) Notice: Subject to any disclaimer, the term of this patent is extended or adjusted under 35 U.S.C. 154(b) by 921 days.

(21) Appl. No.: 11/795,845

(22) PCT Filed: Jul. 27, 2006

(86) PCT No.: PCT/EP2006/050370
§ 371 (c)(1),
(2), (4) Date: Apr. 3, 2008

(87) PCT Pub. No.: WO2006/077255
PCT Pub. Date: Jul. 27, 2006

(65) Prior Publication Data
US 2011/0054736 A1 Mar. 3, 2011

(30) Foreign Application Priority Data
Jan. 24, 2005 (DE) .......... 10 2005 003 291
Jan. 23, 2006 (DE) .......... 10 2006 003 299

(51) Int. Cl.
*B60G 17/018* (2006.01)
*B60G 23/00* (2006.01)
*B62C 3/00* (2006.01)
*B62K 25/00* (2006.01)

(52) U.S. Cl. ..................... 701/37

(58) Field of Classification Search .......... 701/37, 701/38, 41, 48, 79, 70–72, 74–75, 82–83, 701/90–91
See application file for complete search history.

(56) References Cited

U.S. PATENT DOCUMENTS

| | | | |
|---|---|---|---|
| 5,455,770 A | 10/1995 | Hadeler et al. | |
| 6,654,674 B2 | 11/2003 | Lu et al. | |
| 6,795,761 B1 | 9/2004 | Lee et al. | |
| 6,898,500 B2 * | 5/2005 | Kobayashi | 701/48 |
| 7,027,902 B2 | 4/2006 | Lu et al. | |

(Continued)

FOREIGN PATENT DOCUMENTS
DE 10053604 5/2002
(Continued)

*Primary Examiner* — Khoi Tran
*Assistant Examiner* — Harry Oh (57) ABSTRACT

Disclosed is a device for influencing the driving dynamics of a vehicle with an electronic brake system. The device includes a brake actuator for adjusting a brake torque at least one wheel brake of the vehicle. The brake torque can be determined in a torque distributing device according to a yaw torque requirement. A first control unit can be activated in the presence of a critical driving condition as is used to determine a first yaw torque requirement due to driving dynamics control. A management device (12) has a second control unit, which can be activated in the presence of a subcritical driving condition, and a second yaw torque requirement (R:D_GM) can be determined by the second control unit due to driving dynamics control, and the second yaw torque requirement (R:D_GM) can be sent to the torque distributing device (20), and an activated state of the first control unit a signal (I:EBS_Status; R: D_GM; R:[S1, S2, . . . ]) can be sent from the electronic brake system (2) to the management device (12), which causes deactivation of the second control unit.

29 Claims, 4 Drawing Sheets

U.S. PATENT DOCUMENTS

| | | |
|---|---|---|
| 7,079,930 B2 * | 7/2006 | Gerdes ............................ 701/48 |
| 7,136,730 B2 | 11/2006 | Lu et al. |
| 7,274,981 B2 * | 9/2007 | Eriksson ........................ 701/37 |
| 7,689,337 B2 * | 3/2010 | Post, II ............................ 701/48 |
| 2002/0143451 A1 | 10/2002 | Hac et al. |
| 2003/0122417 A1 * | 7/2003 | Hackl et al. ................... 303/146 |
| 2004/0158377 A1 * | 8/2004 | Matsumoto et al. ............ 701/48 |
| 2004/0267428 A1 * | 12/2004 | Knoop et al. ................... 701/70 |

FOREIGN PATENT DOCUMENTS

| | | |
|---|---|---|
| DE | 102004006540 | 8/2004 |
| DE | 10319177 | 11/2004 |
| DE | 10328979 | 1/2005 |
| EP | 1213163 | 6/2002 |
| WO | 2005054022 | 6/2005 |

* cited by examiner

DEVICE AND METHOD FOR DRIVING DYNAMICS CONTROL IN A VEHICLE

BACKGROUND OF THE INVENTION

The present invention relates to a device for influencing the driving dynamics of a vehicle with an electronic brake system comprising a brake actuator by which a brake torque is adjustable on at least one wheel brake of the vehicle, and the brake torque can be determined in a torque distributing device according to a yaw torque requirement, and comprising a first control unit which can be activated in the presence of a critical driving condition, the said first control unit being used to determine a first yaw torque requirement due to driving dynamics control.

The invention relates further to a method for influencing the driving dynamics of a vehicle.

Driving dynamics control systems for vehicles are known in the art e.g. by the name ESP (Electronic Stability Program), which stabilize the vehicle in critical driving situations by brake interventions on each individual wheel. The control systems are usually integrated into a brake controlling apparatus of the vehicle and include a control unit and a torque distributing unit. A yaw torque requirement is determined in the control unit depending on a deviation of an actual yaw rate from a nominal yaw rate of the vehicle and depending on the current sideslip angle of the vehicle. Based on this requirement, the torque distribution unit determines the brake torques or brake pressures on each individual wheel, which are set in the wheel brakes by means of a brake actuator.

Besides, driving dynamics control systems for influencing the driving behavior in subcritical driving situations have become known. It is an objective of these controls to improve the vehicle behavior following an intervention, i.e. to reach an improved and direct reaction of the vehicle to the driving commands of the driver and, thus, a more agile driving behavior.

In addition to the brake actuator, additional actuators can be driven to this end in order to influence the driving behavior of the vehicle. In this respect, a so-called overriding steering system can be concerned, which is used to perform steering interventions at the front wheels, a rear-axle steering system, which allows steering interventions at steerable rear wheels of the vehicle, controllable chassis elements such as adjustable dampers or adjustable stabilizers, or controllable elements of the drive train, such as electronically controllable differential locks. In contrast to brake interventions, the interventions of additional actuators of this type are advantageous in that the driver does not notice them as disturbing because the vehicle does not decelerate.

In frequent cases, the control systems for driving the additional actuators relate to systems, which are separated from the ESP system. The problem encountered in this respect is that a superposition of control interventions may occur in critical driving situations, which causes amplification or reduction of the intended effect.

An object of the invention is to render cross-linking of control systems for driving dynamics control possible in critical and subcritical driving situations and to coordinate especially a superposition of control interventions of both systems.

SUMMARY OF THE INVENTION

According to the invention, this object is achieved by a device for influencing the driving dynamics of a vehicle having an electronic brake system comprising a brake actuator for applying a brake on at least one wheel brake of the vehicle, wherein the brake torque can be determined in a torque distributing device according to a yaw torque requirement. The device includes a first control unit which can be activated in the presence of a critical driving condition, the first control unit being used to determine a first yaw torque requirement due to driving dynamics control. The device also includes a management device (12) having a second control unit, which is activated in the presence of a subcritical driving condition. A second yaw torque requirement (R:D_GM) is determined by the second control unit due to driving dynamics control, the second yaw torque requirement (R:D_GM) is sent to the torque distributing device (20), and in an activated state of the first control unit (4) a signal (I:EBS_Status; R:D_GM; R: [S1, S2, . . . ]) is sent from the electronic brake system (2) to the management device (12), which causes deactivation of the second control unit. The object is also achieved by a method for influencing the driving dynamics of a vehicle, in which an electronic brake system is used to adjust brake torque on at least one wheel brake of the vehicle. The method includes determining the brake torque according to a yaw torque requirement and activating a first control unit in the electronic brake system in the presence of a critical driving condition and determines a first yaw torque requirement due to driving dynamics control. The method also includes activating a second control unit in a management device (12) in the presence of a subcritical driving condition. The second control unit determines a second yaw torque requirement (R:D_GM) on the basis of a driving dynamics control operation that is transmitted to a torque distributing device (20) and in an activated condition of the first control unit (4) a signal is sent from the electronic brake system (2) to the management device (12), which causes deactivation of the second control unit.

Accordingly, it is arranged that a device of the type initially referred to is configured in such a way that a management device comprises a second control unit, which can be activated in the presence of a subcritical driving condition, and a second yaw torque requirement can be determined by means of the second control unit due to driving dynamics control, and the second yaw torque requirement can be sent to the torque distributing device, and that in an activated state of the first control unit a signal can be sent from the electronic brake system to the management device, which causes deactivation of the second control unit.

The method of the invention for influencing the driving dynamics of a vehicle, in which an electronic brake system is used to set a brake torque on at least one wheel brake of the vehicle, with the brake torque being determined according to a yaw torque requirement, and in which a first control unit provided in the electronic brake system is activated in the presence of a critical driving condition and determines a first yaw torque requirement on the basis of a driving dynamics control, is implemented in such a fashion that a second control unit comprised in a management device is activated in the presence of a subcritical driving condition, with the second control unit determining a second yaw torque requirement due to driving dynamics control that is transmitted to the torque distributing device, and that in an activated condition of the first control unit a signal is sent from the electronic brake system to the management device, which causes deactivation of the second control unit.

Thus, the invention comprises a control system in which an electronic brake system, which comprises a control unit for performing driving dynamics control in a critical driving condition range, and a management device, which comprises a control unit for performing driving dynamics control in a subcritical driving condition range, are cross-linked in such a manner that it is possible to drive the brake actuator by means of the management device. The term driving dynamics control within the limits of the invention is to be understood in its broadest sense and implies in particular the determination of a yaw torque requirement or adjusting requirements for the direct activation of actuators depending on a deviation between the actual value and a nominal value of a driving condition variable that is e.g. calculated in a vehicle model.

The brake actuator is favorably driven by the management device by way of a yaw torque requirement, which is transmitted to the torque distributing device of the electronic brake system, that determines a brake torque from the yaw torque requirement, which is set at a wheel brake of the vehicle. Thus, the electronic brake system serves the management device as an intelligent actuator, and the management device especially utilizes the functionality existing in the electronic brake system for torque distribution. Hence, only insignificant modifications of the electronic brake system are required in cross-linking the management device and the electronic brake system according to the invention.

In addition, cross-linking is performed in such a way that in the activation of the first control unit, a signal is sent from the electronic brake system to the management device, which causes deactivation of the second control unit. This permits separating the ranges of application of the two control units comprised in the control system of the invention and reliably avoids superpositions of interventions of both control units.

In a favorable embodiment of the device of the invention and the method of the invention, it is provided that the second control unit can be activated when the absolute value of at least one driving condition variable that represents a degree of stability of the driving condition is higher than a first threshold value.

Advantageously, the range of subcritical driving conditions is characterized in that the absolute value of at least one driving condition variable is higher than a first threshold value.

Another favorable embodiment of the device of the invention and the method of the invention provides that the first control unit can be activated when the absolute value of the driving condition variable representing the degree of stability of the driving condition is higher than a second threshold value, with the second threshold value exceeding the first threshold value.

In this respect, the range of critical driving conditions is favorably characterized in that the absolute value of at least one driving condition variable exceeds a second threshold value, which is higher than the first threshold value.

Based on the driving dynamics control performed by the second control unit, the vehicle is stabilized already in the range of subcritical driving conditions so that driving dynamics control by means of the first control unit becomes necessary only upon 'major instability' of the vehicle, when the second control unit is active. As the control interventions controlled by the second control unit are more comfortable for the driver, driving comfort is hereby enhanced.

In a favorable improvement of the device of the invention and the method of the invention, it is therefore provided that a status information, which indicates the activity status of the second control unit, can be transmitted from the management device to the electronic brake system, and that the second threshold value is variable depending on the activity status of the second control unit.

In an especially suitable embodiment of the device of the invention and the method of the invention, it is furthermore provided that the second threshold value can be increased when it is detected in the electronic brake system by way of the status information that the second control unit is active.

A preferred embodiment of the device of the invention and the method of the invention is characterized in that an adjusting requirement for the activation of at least one actuator that influences the driving dynamics of the vehicle can be determined in the management device.

In addition to the brake actuator, whose interventions are uncomfortable for the driver due to their decelerating effect, additional actuators can, thus, be employed to perform control interventions. They permit more comfortable control interventions, which cannot or can hardly be felt by the driver.

A suitable embodiment of the device of the invention and the method of the invention further includes that the additional actuator is controllable by means of the management device according to the adjusting requirement.

In a favorable embodiment of the device of the invention and the method of the invention, it is furthermore provided that the signal transmitted by the electronic brake system to the management device is an activity signal indicating an activity of the first control unit, and that a neutral behavior of the additional actuator is adjustable by means of the management device upon receipt of the activity signal.

In this embodiment, the first control unit can perform a conventional ESP control in a simple fashion in which the additional actuator is not enabled. Exclusively the brake actuator is enabled in this case based on the first yaw torque requirement determined in the first control unit.

Therefore, a suitable embodiment of the device of the invention and the method of the invention arranges that the first yaw torque requirement can be transmitted to the torque distributing device.

A preferred embodiment of the device of the invention and the method of the invention is characterized in that the signal transmitted from the electronic brake system to the management device is the first yaw torque requirement, and that based on the first yaw torque requirement an adjusting requirement for the activation of the additional actuator and/or another yaw torque requirement can be determined by means of the management device, and the further yaw torque requirement can be transmitted to the torque distributing device.

This embodiment is advantageous because the potential of the additional actuators can be made use of to influence the driving dynamics of the vehicle also in the range of critical driving conditions. In this arrangement, a first yaw torque requirement is determined additionally in the first control unit in a conventional manner. The activation of the brake actuator and the additional actuators according to the first yaw torque requirement can be performed by way of existing functionalities of the management device, which is also used to actuate and tune these actuators in the range of subcritical driving conditions.

Another appropriate embodiment of the device of the invention and the method of the invention is characterized in that the signal transmitted from the electronic brake system to the management device is an adjusting requirement for the activation of the additional actuator, which is determined in the first control unit in addition to the first yaw torque requirement, and activation of the additional actuator can be performed by means of the management device according to the adjusting requirement.

In this embodiment, the adjusting requirement for the activation of the additional actuator is determined already in the first control unit, with the result that it can be adapted especially properly to the requirements of driving dynamics control in the critical range of driving conditions.

To activate the brake actuator, it is provided in a favorable embodiment of the device of the invention and the method of the invention that the first yaw torque requirement determined by the first control unit can be sent within the electronic brake system to the torque distributing device.

Furthermore, a suitable embodiment of the device of the invention and the method of the invention provides that the first yaw torque requirement determined by the first control unit can be transmitted to the torque distributing device by way of the management device.

In addition, a favorable embodiment of the device of the invention and the method of the invention is characterized in that the additional actuator is a control element that permits adjusting an additional steering angle at front wheels of the vehicle steerable by the driver.

In another favorable embodiment of the device of the invention and the method of the invention, it is provided that the additional actuator is a control element that permits adjusting a steering angle at rear wheels of the vehicle.

Furthermore, it is provided in a favorable embodiment of the device of the invention and the method of the invention that the additional actuator is a control element that permits influencing a chassis of the vehicle.

An expedient improvement of the device of the invention and the method of the invention is characterized in that the control element is at least one adjustable damper.

In another expedient improvement of the device of the invention and the method of the invention, the control element is an adjustable stabilizer at an axle of the vehicle.

Further advantages, special characteristics and suitable improvements of the invention can be seen in the following description of preferred embodiments by way of the Figures.

DETAILED DESCRIPTION OF THE DRAWINGS

The invention is preferably based on a four-wheel motor vehicle with two front wheels and two rear wheels. The front wheels can be steered by the driver of the vehicle by means of a steering operation device. Further, the vehicle is equipped with a drive motor, which supplies a drive torque demanded by the driver by means of an operating device, said drive torque being transmitted to the front wheels and/or rear wheels by way of a drive train. In addition, the vehicle is equipped with a brake system, which can be operated by the driver using a brake operating device. Associated with each wheel of the vehicle is a wheel brake comprised in the brake system, by which a brake torque for decelerating the wheel can be produced.

Besides, the brake system comprises an electronic brake system (EBS), which is accommodated in a brake controlling apparatus and activates one or more brake actuators, which are used to produce brake torque at the wheel brakes irrespective of a brake operation by the driver in order to influence the driving behavior of the vehicle. The brake actuators are designed in a way that is principally known to any expert in the art.

Preferably, the brake system is designed as a hydraulic brake system, in which brake pressure that develops in a master brake cylinder is transmitted through hydraulic conduits to the wheel brakes. The brake actuators in this embodiment of the invention preferably refer to electromagnetically operable valves, which separately connect the wheel brakes to the master brake cylinder, and a motor-driven pump that allows supplying pressure fluid into the wheel brakes and out of the wheel brakes. The valves and the pump are component parts of a hydraulic unit controlled by the brake controlling apparatus. Alternatively, however, it is also possible to e.g. employ an active brake booster as a brake actuator in order to build up brake pressure in the wheel brakes irrespective of the driver.

To perform driving dynamics control in the presence of a critical driving condition, the electronic brake system (EBS) comprises an ESP system, in which corrective signals for activating the brake actuator are determined, what will be explained more precisely in the following.

In addition, the vehicle includes additional actuators, which can be activated likewise to influence the driving behavior. The vehicle includes at least one, however, preferably a number of additional actuators.

As an additional actuator, preferably a so-called active steering system is employed, which allows adjusting an additional steering angle irrespective of the driver in addition to the steering angle adjusted by the driver at the front wheels. For example, the actuator can be designed as an overriding steering system, which comprises a gear inserted into the steering line, by which the additional steering angle can be introduced into the steering line using a servo motor. Further, additional actuators can be employed to influence the chassis or to influence the roll performance of the vehicle. Actuators of this type are per se known to the expert in the art and can e.g. be designed as adjustable wheel dampers or adjustable stabilizers. Further, the additional actuator can concern a rear-axle steering system, which allows adjusting an additional steering angle at the rear wheels of the vehicle. In addition, actuatable elements can e.g. be used within the drive train, such as controllable compensating gears (differentials), as additional actuators for influencing the driving behavior of the vehicle.

In contrast to the interventions of the brake actuator, which are accompanied by a deceleration of the vehicle that can be noticed by the driver, the additional actuators allow taking interventions, which are unnoticed by the driver. While the brake actuator is used to perform above all interventions to stabilize the driving behavior in critical driving situations in the fashion known to the expert in the art within the limits of driving dynamics control by an ESP system, the additional actuators are also apt for interventions to influence the driving behavior in uncritical driving situations. Interventions of this type permit improving especially the subsequent vehicle behavior and, thus, the agility of the vehicle. Driving dynamics control in uncritical driving situations and activation of the additional actuators is performed within the limits of the invention by a chassis management device (CM).

In the invention, two control units are used for driving dynamics control, which concern the control unit of an ESP system integrated into the electronic brake system (EBS) and a control unit contained in the chassis management device (CM).

It is provided within the limits of the invention that the electronic brake system (EBS) and the chassis management device (CM) are cross-linked. In one embodiment of the invention, the chassis management device (CM) is contained in a control device that is separated and spaced from the brake controlling apparatus, in which the electronic brake system (EBS) is incorporated. Data exchange between the chassis management device (CM) and the electronic brake system (EBS) or between the two controlling apparatus takes place through a data bus in this embodiment. The data bus can e.g. be the CAN bus (CAN: Controller Area Network), which is typically employed in motor vehicles. In another embodiment of the invention, however, it can be equally provided that the electronic brake system (EBS) and the chassis management device (CM) are accommodated in the brake controlling apparatus so that the data exchange can be carried out inside the controlling apparatus.

Figure 1A:
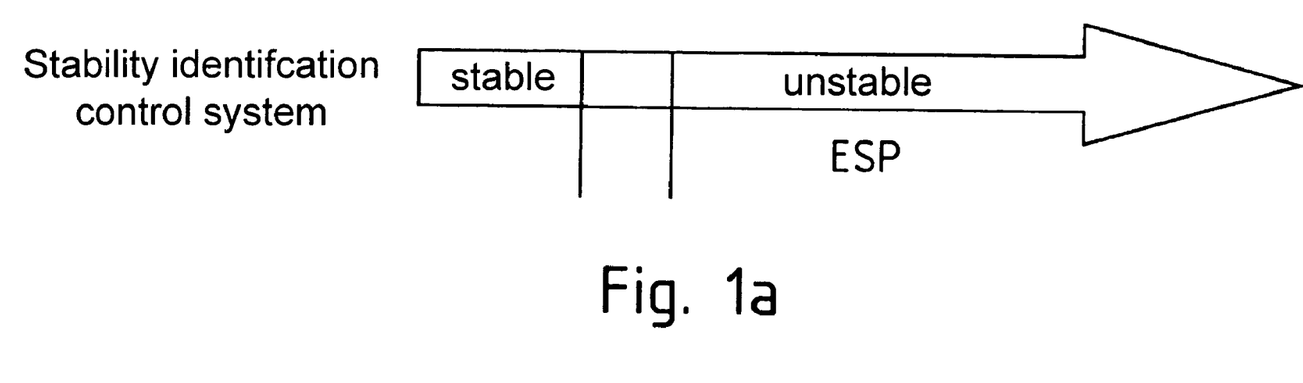
FIG. 1a is a schematic view of the driving condition range in which driving dynamics control is performed by a conventional ESP system.
Figure 1B:
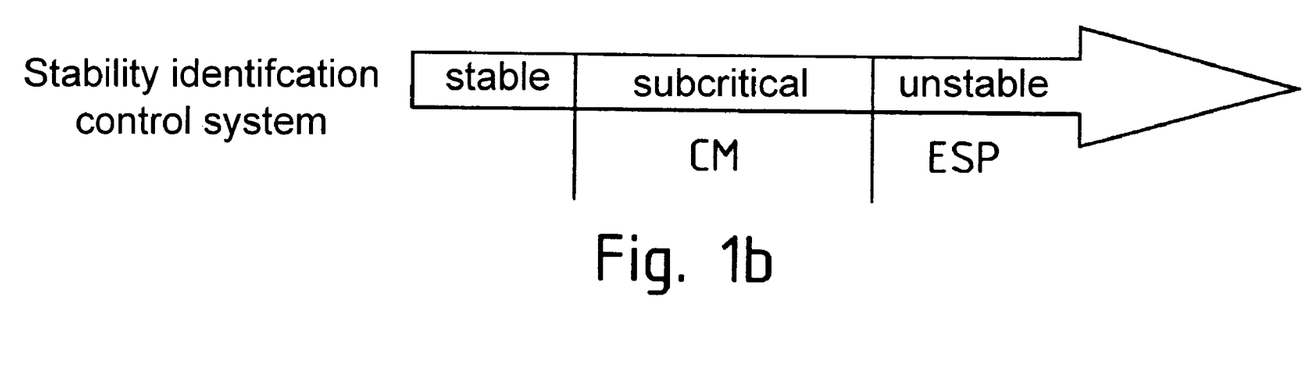
FIG. 1b is a schematic view of the driving condition range in which driving dynamics control is performed by means of a chassis management device cross-linked to the ESP system and by means of the ESP system.

FIGS. 1a and 1b illustrate the ranges of application of the two control units compared to the range of application of a conventional ESP system as known to the expert in the art. For different stability identifications, the control system provided in each case for driving dynamics control is indicated in the Figures.

As is schematically illustrated in FIG. 1a, the driving condition of the vehicle is influenced by means of a conventional ESP system when an unstable driving condition prevails.

The degree of stability of the driving condition is preferably characterized by way of at least one driving condition variable, for example, by way of the yaw rate deviation between a reference yaw rate calculated in a vehicle model and an actual yaw rate of the vehicle measured by means of a yaw rate sensor, the sideslip angle of the vehicle and/or the lateral acceleration of the vehicle.

An unstable driving condition of the vehicle is prevailing when the amounts of the vehicle condition variable taken into account for the evaluation of the driving condition, which will be referred to as evaluation parameters in the following, exceed predetermined threshold values. The threshold values also represent the entry thresholds of the ESP control, that means, a driving dynamics control operation by the ESP system takes place only when the amounts of the evaluation parameters exceed the threshold values or the amount of at least one evaluation parameter exceeds the corresponding threshold value.

A stable driving condition prevails when the absolute values of the evaluation parameters are lower than additional threshold values, which in turn are lower than the entry threshold value of the ESP control. Stable driving conditions are characterized in that the vehicle optimally follows the driver's specifications, in particular the steering instructions of the driver.

There is a range between the range of stable driving conditions and the range of unstable driving conditions, in which the vehicle behavior is not optimal, in which the degree of stability of the vehicle, however, does not necessitate an ESP control that impairs the driving comfort. This range is referred to as subcritical range of driving conditions within the limits of the invention.

As is shown in FIG. 1b, driving dynamics control in this range of driving conditions occurs by the chassis management device (CM), and control interventions are made especially by means of the additional actuators, however, also by means of the brake actuator. Serving as entry threshold for driving dynamics control by the chassis management device (CM) are first threshold values for the evaluation parameters, which are lower than second threshold values that are decisive for the entry into the ESP control.

As the control interventions, which are performed in the range of subcritical driving conditions by the chassis management device (CM), bring about stabilization of the driving condition of the vehicle in addition to an improvement of the vehicle behavior following an intervention, the driving condition range in which an ESP control operation is carried out can be shifted towards 'greater instability'. Therefore, higher entry thresholds are provided for the ESP control within the limits of the invention as compared to the conventional ESP system when the control unit contained in the chassis management device (CM) is active.

It is thus provided within the limits of the invention that first threshold values for the evaluation parameters are predefined, and the driving condition is classified as a subcritical driving condition when they are exceeded. The first threshold values serve as entry thresholds for driving dynamics control by means of the chassis management device (CM). In addition, second threshold values are predefined, which are higher than the first threshold values, and the driving condition is classified as a critical driving condition when they are exceeded. The second threshold values serve as entry thresholds for driving dynamics control by means of the ESP system.

It is preferably arranged that the ranges of application of the two control units are separated. A driving dynamics control operation by the chassis management device (CM) occurs only when the values of an evaluation parameter or several evaluation parameters lie between the first and the second threshold value. A driving dynamics control operation by the ESP system is performed only when the absolute values of one or more evaluation parameters are higher than the second threshold values. Separation of the ranges of application of the two control units avoids a superposition of control interventions of the ESP system and the chassis management device (CM), which possibly has unfavorable effects on the vehicle performance.

Figure 2:
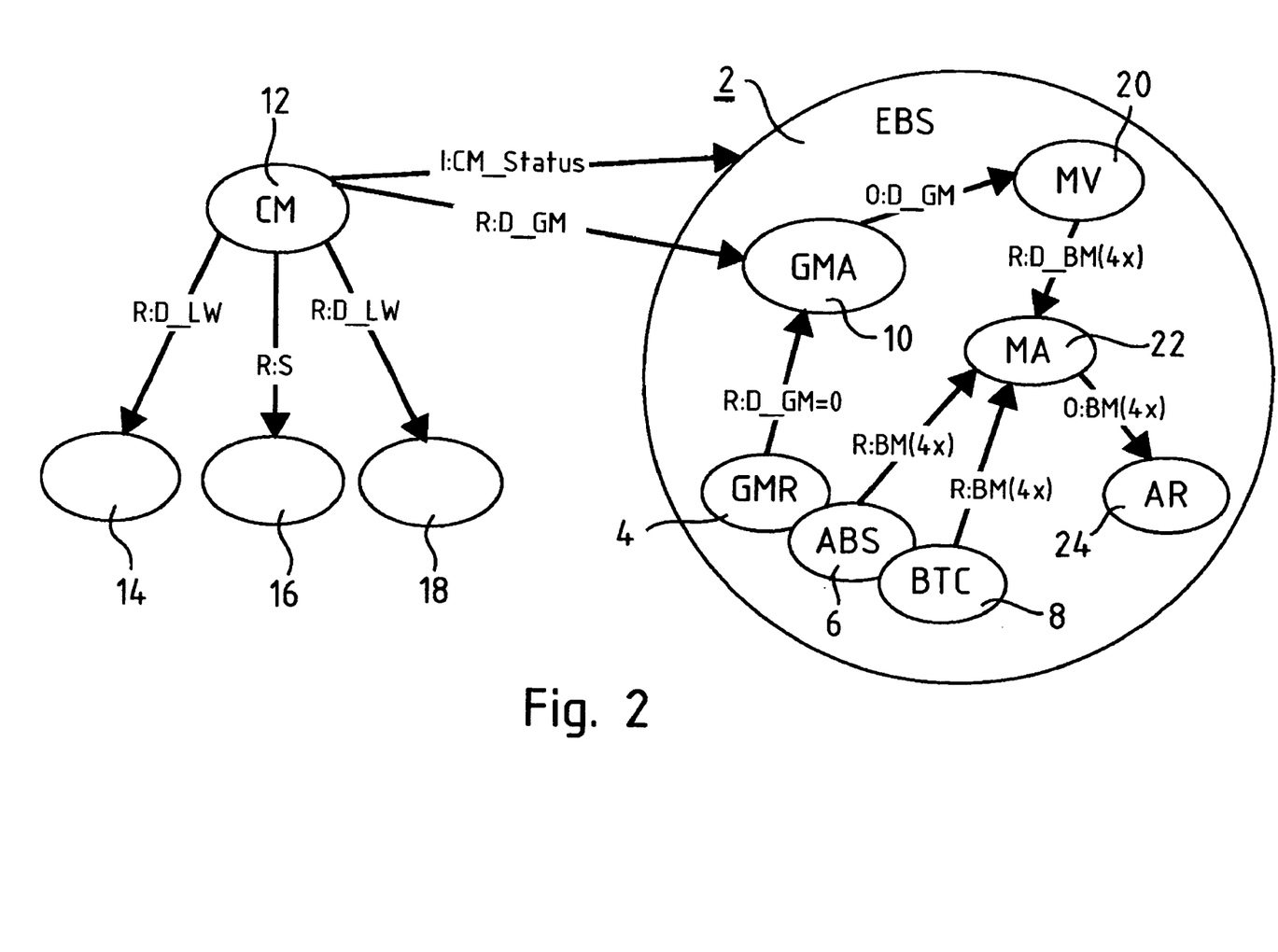
FIG. 2 is a schematic view of a control system of the invention and an illustration of driving dynamics control in the presence of a subcritical driving condition.

FIG. 2 shows a schematic view of the implementation of driving dynamics control by means of the control system of the invention in the range of subcritical driving conditions.

FIG. 2 especially depicts the electronic brake system (EBS) 2, which is integrated into the brake controlling apparatus of the vehicle, for example, and comprises one or more control units 4, 6, 8, that can be designed e.g. as software modules. At least, the electronic brake system (EBS) 2 comprises the control unit (YTC: yaw torque control) 4, which is part of the ESP system and is employed for driving dynamics control in the range of critical driving conditions.

To perform driving dynamics control, a yaw rate deviation is determined between a reference yaw rate, which is defined in a vehicle reference model by way of driver specifications such as the vehicle speed and the steering angle adjusted by the driver at the front wheels of the vehicle, and a nominal yaw rate sensed by means of a yaw rate sensor. Besides, an assessed value for the present sideslip angle of the vehicle is determined.

Depending on the yaw rate deviation and the present sideslip angle or a difference between the present sideslip angle and a reference value and, optionally, additional driving condition variables such as the lateral acceleration of the vehicle, the control unit (GMR) 4 in the active state determines an additional yaw torque requirement (R:D_GM), the value of which corresponds to an additional yaw torque that stabilizes the vehicle. In the absence of a critical driving condition, the control unit (GMR) 4 is inactive. In the inactive state, no additional yaw torque requirement (R:D_GM) or an additional yaw torque requirement having the value zero (R:D_GM=0) is determined in the control unit (GMR) 4.

The control unit (GMR) 4 is connected in terms of signals to a yaw torque arbitration device (GMA) 10. The yaw torque arbitration device (GMA) 10 represents an interface between the electronic brake system (EBS) 2 and the chassis management device (CM) 12, which allows the brake actuator to be activated by the chassis management device (CM) 12.

The chassis management system (CM) 12 comprises another control unit (not shown in FIG. 2), in which an additional yaw torque is determined, e.g. likewise depending on the yaw rate deviation and/or further driving condition variables. The control unit provides a distributing function, which determines from the additional yaw torque an additional yaw torque requirement (R:D_GM), for the activation of the vehicle brakes as well as additional adjusting requirements for the activation of the additional actuators 14, 16, 18. The additional adjusting requirements in the embodiment of the invention illustrated in FIG. 2 concern an additional steering angle requirement (R:D_LW) for the activation of the active steering system 14, an adjusting requirement (R:S) for the activation of the additional actuators 16 that act on the chassis, meaning e.g. wheel load differences at a vehicle axle which are adjustable by means of a controllable stabilizer, and an additional steering angle requirement (R:D_LW) for the activation of the rear-axle steering system 18.

The additional yaw torque requirement (R:D_GM) determined by the control unit of the chassis management device (CM) is transmitted to the yaw torque arbitration device (GMA) 10 of the electronic brake system (EBS) 2 and is relayed there to a torque distributing device (MV) 20. The torque distributing device (MV) 20 is usually also a component of a conventional ESP system known to the expert in the art, and its task is to convert the additional yaw torque determined in the control unit (GMR) 4 into additional brake torque requirements (R:D_BM) for the four wheel brakes of the vehicle.

Within the limits of the invention, the functionality of the torque distributing device (MV) 20 is not modified compared to the conventional design of the electronic brake system (EBS) 2. The difference over the conventional ESP system only resides in that the torque distributing device (MV) 20 is furnished with additional yaw torque nominal values (O:D_GM) from the yaw torque arbitration device (GMA) 10.

Said determines the additional yaw torque nominal values (O:D_GM) by way of the additional yaw torque requirement (R:D_GM) of the control unit (GMR) 4 and the chassis management device (CM) 12.

The additional brake torque requirements (R:D_BM) determined in the torque distributing device (MV) 20 are submitted to a torque arbitration device (MA) 22, which is further furnished with brake torque requirements (R:BM) for the four wheel brakes from further control units 6, 8 comprised in the electronic brake system (EBS) 2.

The control unit (ABS: anti-lock system) 6 is used to perform a brake slip control, in which the vehicle wheels are prevented from locking during a brake operation by reducing the brake torque at wheels with great slip. The control unit (BTC: Brake Traction Control) 8 performs brake control, which is known to the expert in the art by the name of traction slip control (TSC) and prevents spinning of the drive wheels of the vehicle during acceleration maneuvers.

Arbitration of the brake torque requirements (R:BM) of the control units 6 and 8 and the additional brake torque requirements (R:D_BM) determined in the torque distributing device (MV) 20 takes place in the torque arbitration device (MA) 22. In this arbitration, nominal brake torques (O:BM) for the four wheel brakes of the vehicle are determined, which are adjusted in the wheel brakes by means of the brake actuator. To this end, the nominal brake torques (O:BM) are transmitted from the torque arbitration device (MA) 22 to an actuator control unit (AR) 24, which generates control commands for activating the brake actuator according to the nominal brake torques (O:BM).

The illustrated structure of the driving dynamics control system allows a simple cross-linking of the chassis management device (CM) 12 and the electronic brake system (EBS) 2 or the ESP system, respectively, where the functionality of the electronic brake system (EBS) 2 can be used by the chassis management device (CM) 12 without the need to use the internal interfaces of the electronic brake system (EBS) 2. Advantageously, an interface is provided with the yaw torque arbitration device (GMA) 10, which allows the chassis management device (CM) 12 to use the brake controlling apparatus as an intelligent actuator.

As has been mentioned before, it is provided within the limits of the invention that the entry thresholds of the evaluation parameters, which are decisive for the entry of the ESP system into the driving dynamics control, are adapted. This adaptation is carried out depending on the status information (I:CM_Status), which is transmitted from the management device (CM) 12 to the electronic brake system (EBS) 2. The status information contains information about the activity status of the chassis management device (CM) 12 indicating whether the control unit comprised in the chassis management device (CM) 12 is active. If this is the case, the field of application of the ESP system is shifted towards 'greater instability'. To this end, the magnitudes of the threshold values, which are decisive for an entry into the ESP control, are raised when it is detected by way of the status signal (I:CM_Status) that the control unit in the chassis management device (CM) 12 is active. This control unit is deactivated in the range of critical driving conditions, which is characterized by the corresponding threshold values of the evaluation parameters. The control unit (GMR) 4 of the ESP system is activated and performs driving dynamics control in this range.

In particular in the transition between the range of subcritical driving conditions and the range of critical driving conditions it may occur that both the control unit comprised in the chassis management device (CM) 12 and the control unit (GMR) 4 of the ESP system, which is also connected to the yaw torque arbitration device (GMA) 10, are activated. In this case, conflicting additional yaw torque requirements (R:D_GM) are received in the yaw torque arbitration device (GMA) 10, and arbitration is carried out. To avoid superposition of brake interventions of both systems, it is provided that one of the additional yaw torque requirements (R:D_GM) is relayed to the torque distributing device (MV) 20 in a prioritizing operation, while the second additional yaw torque requirement (R:D_GM) is blocked. It is preferably arranged that the additional yaw torque requirement (R:D_GM) received from the chassis management device is passed on because it is adapted to the interventions performed by means of the additional actuators 14, 16, 18, which are likewise performed when the control unit comprised in the chassis management device (CM) 12 is active.

Figure 3:
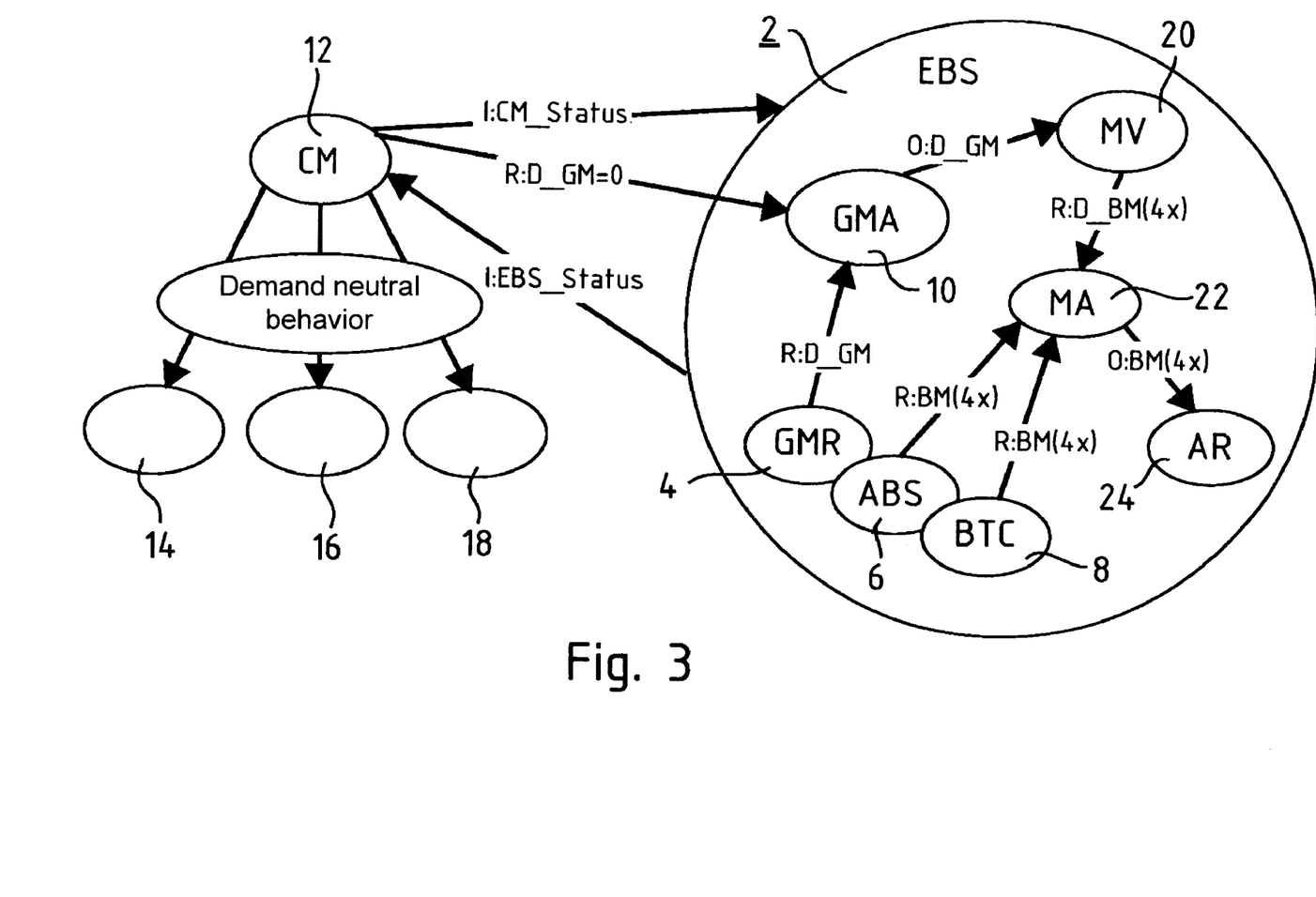
FIG. 3 is a schematic view of a control system of the invention and an illustration of driving dynamics control in the presence of a critical driving condition in a first embodiment.

Driving dynamics control in the range of critical driving conditions can be performed using different embodiments in the control system of the invention. FIG. 3 shows a first embodiment. It is provided in this embodiment that additional actuators are not active in the presence of a critical driving condition or a neutral behavior of the additional actuators is demanded, respectively. It is arranged for that electronic brake system (EBS) 2 transmits a status information (I:EBS_Status) to the chassis management device (CM) 12, indicating whether the control unit (GMR) 4 of the ESP system has been activated. The chassis management device (CM) 12 is programmed in such a way that it deactivates the control unit, that a neutral behavior of the additional actuators 14, 16, 18 is demanded and that no additional yaw torque requirement (R:D_GM) or an additional yaw torque requirement with the value zero (R:D_GM=0) is transmitted to the electronic brake system (EBS) 2 when it is detected that the control unit (GMR) 4 of the ESP system is active.

An additional yaw torque requirement (R:D_GM) different from zero is determined in the range of critical driving conditions in the control unit (GMR) 4 of the ESP system and is transmitted to the yaw torque arbitration device (GMA) 10 in the embodiment of the invention illustrated in FIG. 3. Device 10 passes the additional yaw torque requirement (R:D_BM) as an additional yaw torque nominal value (O:D_GM) on to the torque distributing device (MV) 20, which calculates additional brake torque requirements (R:D_BM) according to the additional yaw torque nominal value (O:D_GM) in the fashion described before and sends it to the torque arbitration device (MA) 22. Based on an arbitration of the additional brake torque requirements (R:D_BM) and the brake torque requirements (R:BM) of the control units 6 and 8, it defines the brake torque nominal values (O:BM), which are adjusted in the wheel brakes by means of the brake actuator control device (AR) 24.

The advantage of this embodiment of the invention can be seen in a very simple driving dynamics control by the ESP system which needs not take the additional actuators 14, 16, 18 into consideration. However, the potential of the additional actuators is not used to influence the driving behavior of the vehicle. In addition, the transition of the additional actuators 14, 16, 18 into the neutral state during a current control operation can have unfavorable effects on the driving performance of the vehicle.

In preferred embodiments of the invention, which are explained hereinbelow by way of FIG. 4, it is therefore arranged that the additional actuators 14, 16, 18 are also used to stabilize a critical driving condition. The adjusting requirements are determined from signals being sent by the control unit (GMR) 4 of the ESP system, which is active when a critical driving situation prevails, to the chassis management device (CM) 12. The receipt of such signals furnishes the chassis management device (CM) especially with information about the fact that the control unit (GMR) 4 of the ESP system is active. It is provided that the control unit comprised in the chassis management device (CM) 12 is deactivated on account of the receipt of such signals indicative of an activity of the control unit (GMR) 4.

Figure 4:
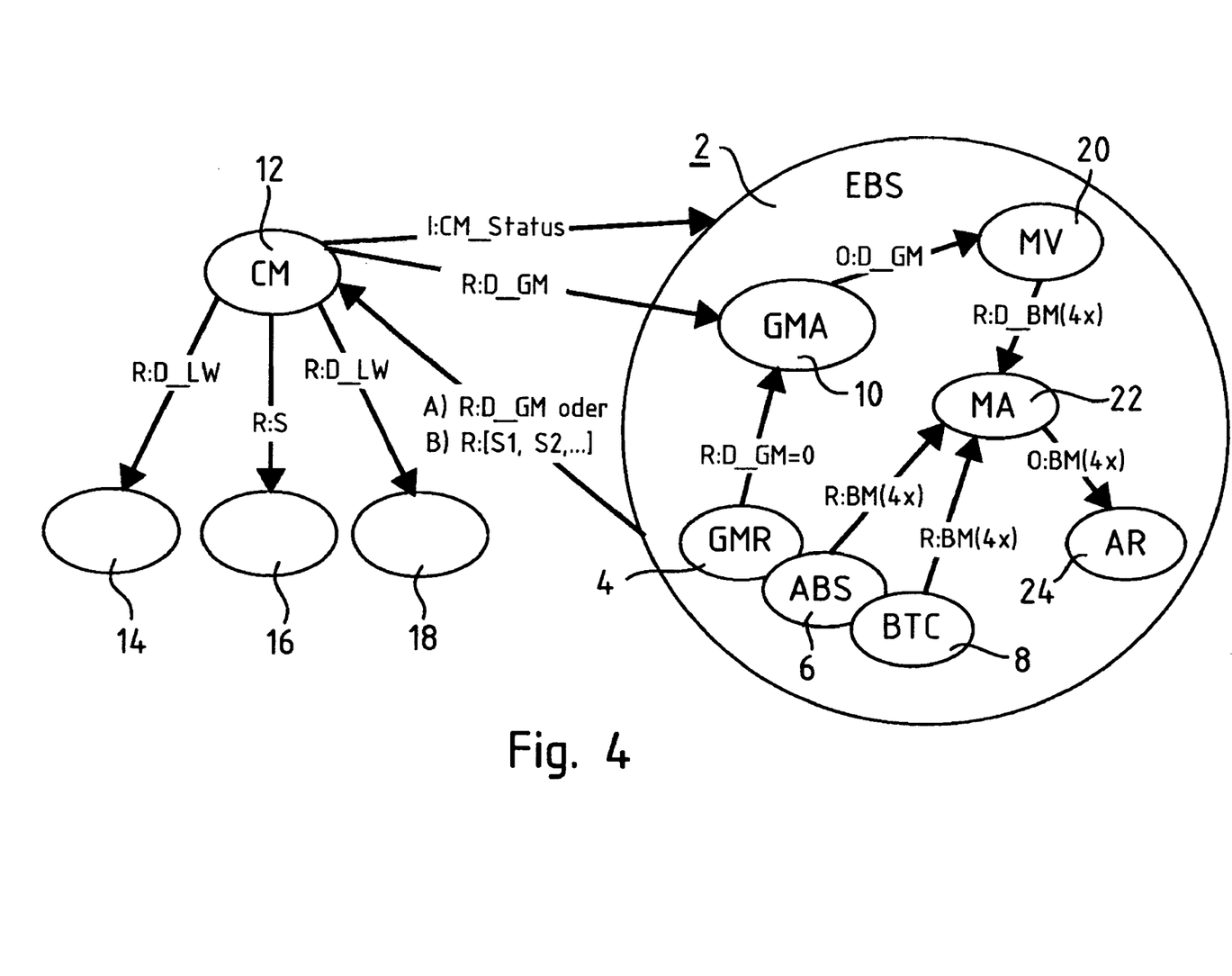
FIG. 4 is a schematic view of a control system of the invention and an illustration of driving dynamics control in the presence of a critical driving condition in other embodiments.

When a critical driving condition prevails, the direction of command in the embodiments of the invention illustrated in FIG. 4 is reversed. This means, in a reversal of the direction, in which adjusting requirements or additional yaw torque requirements (R:D_GM) are exchanged in the presence of a subcritical driving situation between the chassis management device (CM) 12 and the electronic brake system (EBS) 2, adjusting requirements or an additional yaw torque requirement (R:D_GM) are transmitted from the electronic brake system (EBS) 2 to the chassis management device in this case. As is shown in FIG. 4, especially two versions of the invention can be provided.

In a first version (variation A), an additional yaw torque requirement (R:D_GM) is determined in the control unit (GMR) 4 of the ESP system when a critical driving condition prevails, which is then sent to the chassis management device (CM) 12.

Upon receipt of the additional yaw torque requirement (R:D_GM) in the chassis management device (CM) 12, the control unit comprised in the chassis management device (CM) 12 is deactivated. Further, the chassis management device (CM) 12 interprets the additional yaw torque requirement (R:D_GM) and puts it into practice using the additional actuators 14, 16, 18 and the brake actuator.

The adjusting requirements (R:D_LW, R:S) for the activation of the additional actuators 14, 16, 18 and another additional yaw torque requirement (R:D_GM) for the activation of the brake actuator are determined depending on the additional yaw torque requirement (R:D_GM). To determine the adjusting requirements (R:D_LW, R:S) and the further additional yaw torque requirement (R:D_GM), the distribution functionality of the chassis management device (CM) 12 can be used, with the aid of which the adjusting requirements (R:D_LW, R:S) for the activation of the additional actuators 14, 16, 18 and the additional yaw torque requirement (R:D_GM) for the activation of the vehicle brake can be determined also in the range of subcritical driving conditions from an additional yaw torque.

The further additional yaw torque requirement (R:D_GM) is transmitted from the chassis management device (CM) 12 to the yaw torque arbitration device (GMA) 10 of the electronic brake system (EBS) 2 and is converted in the same fashion into an additional brake torque requirement (R:D_BM) to be adjusted at the wheel brakes, as is also the case with the additional yaw torque requirement (R:D_GM), which is sent from the chassis management device (CM) 12 to the electronic brake system (EBS) 2 in the presence of a subcritical driving condition.

In a second version (variation B) illustrated in FIG. 4, the adjusting requirement for the activation of some or all additional actuators 14, 16, 18 is generated already in the control unit (GMR) 4 of the ESP system. A vector of adjusting requirements (R: [S1, S2 . . . ]) is sent from the control unit (GMR) 4 to the chassis management device (CM) 12, and the adjusting requirements are relayed from the chassis management device (CM) 12 to the additional actuators 14, 16, 18 or the control devices of the additional actuators so that they are activated in response to the adjusting requirements. Further, the control unit comprised in the chassis management device (CM) 12 is deactivated also in this embodiment of the invention when the adjusting requirements (R: [S1, S2 . . . ]) are received in the chassis management device (CM) 12.

In addition, an additional yaw torque requirement (R:D_GM) is determined in the control unit (GMR) 4 of the ESP system, which is used to enable the brake actuator. This requirement is likewise transmitted to the chassis management device (CM) 12 in an embodiment of the invention as illustrated in FIG. 4, and is relayed therefrom to the yaw torque arbitration device (GMA) 10. In another embodiment that is not illustrated in FIG. 4, the additional yaw torque requirement (R:D_GM) is transmitted in the electronic brake system (EBS) from the control unit (GMR) 4 to the yaw torque arbitration device (GMA) 10.

In both embodiments illustrated before, the additional yaw torque requirement (R:D_BM) is sent from the yaw torque arbitration device (GMA) 10 as an additional yaw torque nominal value (O:D_GM) to the torque distributing device (MV) 20. It is converted there into additional brake torque requirements (R:D_BM), as described hereinabove, which are transmitted to the torque arbitration device (MA) 22. Based on the additional brake torque requirement (R:D_BM) and the brake torque requirements (R:BM) of the control units 6 and 8, device 22 uses arbitration to determine nominal brake torques (O:BM), which are adjusted in the wheel brakes of the vehicle by means of the brake actuator control device (AR) 24.

Thus, a driving dynamics control system is described in the invention, in which the chassis management device (CM) 12 that performs especially an activation of the additional actuators 14, 16, 18, and a control unit for driving dynamics control in a range of subcritical driving conditions are cross-linked with an electronic brake system (EBS) 2 or an ESP system in a favorable fashion.

The illustrated way of cross-linking allows maintaining essential components of a conventional ESP system so that the cross-linking process requires only insignificant modifications of the electronic brake system (EBS) 2. As a result, it is possible with the illustrated cross-linking process to continue operating the ESP system autonomously upon failure of the chassis management device (CM) 12 so that driving dynamics control in the range of critical driving conditions can be performed also when the chassis management device (CM) 12 fails.

The invention claimed is:

1. A device for influencing the driving dynamics of a vehicle having an electronic brake system comprising a brake actuator for applying a brake on at least one wheel brake of the vehicle, wherein a brake torque can be determined in a torque distributing device according to a yaw torque requirement, the device comprising:
   a first control unit which can be activated in the presence of a critical driving condition, the first control unit being used to determine a first yaw torque requirement due to driving dynamics control; and
   a management device (12) having a second control unit, which is activated in the presence of a subcritical driving condition, wherein a second yaw torque requirement is determined by the second control unit due to driving dynamics control, the second yaw torque requirement is sent to a torque distributing device (20), and in an activated state of the first control unit (4), a signal is sent from an electronic brake system (2) to the management device (12), which causes deactivation of the second control unit.

2. The device as claimed in claim 1, wherein the second control unit is activated when an absolute value of at least one driving condition variable that represents a degree of stability of the driving condition is higher than a first threshold value.

3. The device as claimed in claim 2, wherein the first control unit (4) is activated when the absolute value of the at least one driving condition variable representing the degree of stability of the driving condition is higher than a second threshold value, with the second threshold value exceeding the first threshold value.

4. The device as claimed in claim 3, wherein a status information, which indicates an activity status of the second control unit, is transmitted from the management device (12) to the electronic brake system (2), and the second threshold value is variable depending on the activity status of the second control unit.

5. The device as claimed in claim 4, wherein the second threshold value is increased when the electronic brake system (2) detects by way of the status information that the second control unit is active.

6. The device as claimed in claim 1, wherein the management device (12) determines an adjusting requirement for activation of at least one additional actuator (14; 16; 18) that influences driving dynamics of the vehicle.

7. The device as claimed in claim 6, wherein the at least one additional actuator (14; 16; 18) is controllable by the management device (12) according to the adjusting requirement.

8. The device as claimed in claim 6, wherein the signal transmitted by the electronic brake system (2) to the management device (12) is an activity signal indicating an activity of the first control unit (4), and a neutral behavior of the at least one additional actuator (14; 16; 18) is adjustable by the management device (12) due to receipt of the activity signal.

9. The device as claimed in claim 6, wherein the first yaw torque requirement can be transmitted to the torque distributing device (20).

10. The device as claimed in claim 6, wherein the signal transmitted from the electronic brake system (2) to the management device (12) is the first yaw torque requirement, and based on the first yaw torque requirement, a further yaw torque requirement is determined by the management device (12), and the further yaw torque requirement is transmitted to the torque distributing device (20).

11. The device as claimed in claim 6, wherein the signal transmitted from the electronic brake system (2) to the management device (12) is an adjusting requirement for the activation of the at least one additional actuator (14; 16; 18), which is determined in the first control unit (4) in addition to the first yaw torque requirement, and activation of the at least one additional actuator (14; 16; 18) is performed by the management device (12) according to the adjusting requirement.

12. The device as claimed in claim 11, wherein the first yaw torque requirement determined by the first control unit (4) is sent within the electronic brake system (2) to the torque distributing device (20).

13. The device as claimed in claim 11, wherein the first yaw torque requirement determined by the first control unit (4) is transmitted to the torque distributing device (20) by way of the management device (12).

14. The device as claimed in claim 6, wherein the at least one additional actuator is a control element (14) that permits adjusting an additional steering angle at front wheels of the vehicle steerable by the driver.

15. The device as claimed in claim 6, wherein the at least one additional actuator is a control element (18) that permits adjusting a steering angle at rear wheels of the vehicle.

16. The device as claimed in claim 6, wherein the at least one additional actuator is a control element (16) that permits influencing a chassis of the vehicle.

17. The device as claimed in claim 16, wherein the control element (16) is at least one adjustable damper.

18. The device as claimed in claim 16, wherein the control element (16) is an adjustable stabilizer at an axle of the vehicle.

19. A method for influencing driving dynamics of a vehicle, in which an electronic brake system is used to adjust a brake torque on at least one wheel brake of the vehicle, the method comprising the steps of:
    determining a brake torque according to a yaw torque requirement;

activating a first control unit in an electronic brake system in the presence of a critical driving condition and determining a first yaw torque requirement due to driving dynamics control;

activating a second control unit in a management device (12) in the presence of a subcritical driving condition, wherein the second control unit determines a second yaw torque requirement on the basis of a driving dynamics control operation that is transmitted to a torque distributing device (20), and in an activated condition of the first control unit (4), a signal is sent from the electronic brake system (2) to the management device (12), which causes deactivation of the second control unit.

20. The device as claimed in claim 1, wherein the first control unit is of an ESP system and is integrated into the electronic brake system, and the second control unit is contained in a chassis management device.

21. The device as claimed in claim 20, wherein the electronic brake system and the chassis management device are cross-linked.

22. The device as claimed in claim 20, wherein the chassis management device is separated and spaced from the electronic brake system.

23. The device as claimed in claim 20, wherein data exchange between the chassis management device and the electronic brake system occurs through a data bus.

24. The device as claimed in claim 20, wherein the electronic brake system and the chassis management device are accommodated in a brake controlling apparatus.

25. The method as claimed in claim 19, including the steps of integrating the first control unit of an ESP system into the electronic brake system and containing the second control unit in a chassis management device.

26. The method as claimed in claim 25, including the step of cross-linking the electronic brake system and the chassis management device.

27. The method as claimed in claim 25, including the steps of separating and spacing the chassis management device from the electronic brake system.

28. The method as claimed in claim 25, including the step of exchanging data between the chassis management device and the electronic brake system occurs through a data bus.

29. The method as claimed in claim 25, including the step of accommodating the electronic brake system and the chassis management device in a brake controlling apparatus.

* * * * *